United States Patent
Gavrin et al.

(10) Patent No.: US 9,442,970 B1
(45) Date of Patent: Sep. 13, 2016

(54) SYSTEM AND METHOD FOR ASYNCHRONOUS UPDATE OF A SEARCH INDEX

(71) Applicant: International Business Machines Corporation, Armonk, NY (US)

(72) Inventors: Alexander Gavrin, Moscow (RU); Raymond T. Jones, Jr., Salem, VA (US); Paulo H. Paulin, Florianopolis (BR); Jorge A. Senger, Hortolandia (BR); Maksim Vinokurov, Moscow (RU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/989,977

(22) Filed: Jan. 7, 2016

(51) Int. Cl.
*G06F 7/00* (2006.01)
*G06F 17/30* (2006.01)

(52) U.S. Cl.
CPC ... *G06F 17/30353* (2013.01); *G06F 17/30011* (2013.01); *G06F 17/30117* (2013.01); *G06F 17/30613* (2013.01); *G06F 17/30896* (2013.01)

(58) Field of Classification Search
CPC .............................................. G06F 17/30896
See application file for complete search history.

(56) References Cited

U.S. PATENT DOCUMENTS

| 8,694,503 | B1 | 4/2014 | Naga |
| 8,756,206 | B2 | 6/2014 | Kumar |
| 8,868,526 | B2 | 10/2014 | Balakrishnan |
| 2011/0219008 | A1 | 9/2011 | Been |
| 2012/0030188 | A1 | 2/2012 | Gutlapalli |
| 2012/0078859 | A1 | 3/2012 | Vaitheeswaran |

*Primary Examiner* — Ajith Jacob
(74) *Attorney, Agent, or Firm* — George R. McGuire; Bond Schoeneck & King, PLLC; John Pivnichny (57) ABSTRACT

A method for maintaining a document database and search index includes the steps of: (i) receiving a plurality of document action requests including one or more of a create document action request, a refresh document action request, a refreshfull document action request, an update document action request, or a delete document action request; (ii) creating a timestamp for each of the plurality of received document action requests; (iii) querying the document action requests to determine which are associated with a first document action request type; (iv) processing any of the document action requests of the first document action request type, where the document action requests are processed in the order of their associated timestamp, with earlier document action requests of the first document action request type being processed first; and (v) updating the search index using the updated document database.

20 Claims, 3 Drawing Sheets

FIG. 1

| | DELETE | NEW | UPDATE | REFRESH/FULL |
|---|---|---|---|---|
| DELETE | X | TOA timestamp less and not processed? – STOP<br><br>TOA timestamp is more and not processed? – CONTINUE | TOA timestamp less and not processed? – STOP<br><br>TOA timestamp is more and not processed? – CONTINUE | TOA timestamp less and not processed? – CONTINUE<br><br>TOA timestamp is more and not processed? – CONTINUE |
| NEW | TOA timestamp less and not processed? – STOP<br><br>TOA timestamp is more and not processed? – CONTINUE | X | TOA timestamp less and not processed? – STOP<br><br>TOA timestamp is more and not processed? – CONTINUE | TOA timestamp less and not processed? – CONTINUE<br><br>TOA timestamp is more and not processed? – CONTINUE |
| UPDATE | TOA timestamp less and not processed? – STOP<br><br>TOA timestamp is more and not processed? – CONTINUE | NEW_TOA < DELETE_TOA? - SKIP<br><br>TOA timestamp less and not processed? – STOP<br><br>TOA timestamp is more and not processed? – CONTINUE | X | TOA timestamp less and not processed? – CONTINUE<br><br>TOA timestamp is more and not processed? – CONTINUE |
| REFRESH/FULL | DELETE_TOA > NEW_TOA or DELETE_TOA > UPDATE_TOA? - SKIP | TOA timestamp less and not processed? – STOP<br><br>TOA timestamp is more and not processed? – CONTINUE | TOA timestamp less and not processed? – CONTINUE<br><br>TOA timestamp is more and not processed? – CONTINUE | X |

SYSTEM AND METHOD FOR ASYNCHRONOUS UPDATE OF A SEARCH INDEX

FIELD OF THE INVENTION

The present invention is directed to methods and systems for accurately maintaining a document database and associated search index which are constantly being updated.

BACKGROUND

A Source System of Record ("SSoR") is an information storage and retrieval system that is the authoritative source for a particular data element or piece of information in a system containing multiple sources of the same element. To ensure data integrity, there must be one—and only one—system of record for a given piece of information. Often, a large network with multiple information systems or sources may disagree about a data element or piece of information. These disagreements may stem from semantic differences, use of different sources, or may simply be the result of an error or bug, among other causes.

If there is no association with a reputable source, such as the SSoR, the integrity and validity of any piece of data can be suspect. Accordingly, maintaining SSoR is often a key requirement for Enterprise Search solutions, which assumes continuous data updates from one or more content authors, called the "push." The original data submitted by the one or more content authors must be stored in SSoR to allow reprocessing without being dependent on the content authors. The ability to reprocess data is an essential requirement, for example, for systems which use taxonomy-based drill-down. If taxonomy is changed, affected documents have to be reprocessed to ensure taxonomy changes are reflected in the appropriate index fields.

This need to reprocess and update must be balanced with the need to use the same data to build an optimized index, such as a Search Index (SI) for the search frontend via one or more predefined rules. Often service-level agreements with content authors may define a certain maximum time for a document to reach a frontend index. Accordingly, it is important to ensure that the requirements of the service-level agreements are met even when the documents and/or metadata have to be recalculated from SSoR.

Existing enterprise search solutions do not allow reprocessing of data while accepting new push, update, and/or delete requests. Accordingly, these solutions block incoming requests whenever reprocessing occurs, usually by queueing them, or they queue updates via batches and process them one batch after another. This solution results in significant delays in content processing, which can interfere with efficiency, and in many cases can violate the terms of one or more service-level agreements which define a certain maximum time for a document to reach a frontend index.

Accordingly, there is a continued need in the art for systems and methods that allow on-demand updating of a search index from SSoR while simultaneously accepting push, update, and/or delete requests from content authors.

SUMMARY OF THE INVENTION

The disclosure is directed to inventive methods and systems for accurately maintaining a constantly-updated document database and associated search index. The search index is asynchronously updated from SSoR while accepting push, update, and/or delete requests from content authors. The system maintains the integrity of data for situations where push, update, and/or delete requests of the same SSoR documents are received while the search index is simultaneously being updated. According to an embodiment, the asynchronous updating process comprises a number of sub-processes. To ensure integrity of data and obtain the fastest and most efficient processing time, there are specific rules regulating how the sub-processes function and how they push data from SSoR into the search index.

According to this aspect there is a method for accurately maintaining a constantly-updated document database and associated search index. The method includes the steps of: (i) receiving a plurality of document action requests, where the plurality of document action requests comprise at least one of a create document action request, an update document action request, or a delete document action request; (ii) associating a timestamp with each of the plurality of received document action requests; (iii) querying the document action requests to determine which are associated with a first document action request type; (iv) processing any of the document action requests of the first document action request type, where the document action requests are processed in the order of their associated timestamp, with earlier document action requests of the first document action request type being processed first; and (v) updating the search index using the updated document database.

According to an embodiment, the method further includes the steps of querying the document action requests to determine which are associated with a second document action request type; and processing any of the document action requests of the second document action request type, where the document action requests are processed in the order of their associated timestamp, with earlier document action requests of the second document action request type being processed first; and where the document action requests of the second document action request type are processed only if the document action requests of the first document action request type have been processed.

According to an embodiment, the method further includes the steps of querying the document action requests to determine which are associated with a third document action request type; and processing any of the document action requests of the third document action request type, where the document action requests are processed in the order of their associated timestamp, with earlier document action requests of the third document action request type being processed first; and where the document action requests of the third document action request type are processed only if the document action requests of the second document action request type have been processed.

According to an embodiment, create document action requests are processed first, update document action requests are processed second, and delete document action requests are processed last According to an embodiment, the search index is based on document content, taxonomy data, and/or additional metadata fields.

According to an embodiment, the method further includes the step of creating a database record for each document action request, wherein the database record comprises document data and document metadata.

According to an embodiment, the document metadata comprises the timestamp for said document action request.

According to an embodiment, each type of document action request is processed by a different sub-process, and further wherein each sub-process is associated with a time that the sub-processed last processed a document action request.

According to an embodiment, the time that the sub-process last processed a document action request is stored in the database and will be updated when the same action is requested again against the same document.

According to an embodiment, each sub-process is associated with a predetermined processing time threshold.

According to an embodiment, the method further includes the step of terminating a sub-process if the predetermined processing time threshold is exceeded.

According to an aspect is an SSoR system. The system includes: a document database comprising a plurality of documents; a search index; and a processor in communication with the document database and the search index. The processor is configured to: (i) receive a plurality of document action requests, the plurality of document action requests comprising at least one of a create document action request, an update document action request, or a delete document action request; (ii) associate a timestamp with each of the plurality of received document action requests; (iii) query the document action requests to determine which are associated with a first document action request type; (iv) process any of the document action requests of the first document action request type, wherein the document action requests are processed in the order of their associated timestamp, with earlier document action requests of the first document action request type being processed first; and (v) update the search index using the updated document database.

According to an embodiment, the processor is further configured to: (i) query the document action requests to determine which are associated with a second document action request type; and (ii) process any of the document action requests of the second document action request type, wherein the document action requests are processed in the order of their associated timestamp, with earlier document action requests of the second document action request type being processed first, wherein the document action requests of the second document action request type are processed only if the document action requests of the first document action request type have been processed.

According to an embodiment, the processor is further configured to: (i) query the document action requests to determine which are associated with a third document action request type; and (ii) process any of the document action requests of the third document action request type, wherein the document action requests are processed in the order of their associated timestamp, with earlier document action requests of the third document action request type being processed first, wherein the document action requests of the third document action request type are processed only if the document action requests of the second document action request type have been processed.

These and other aspects of the invention will be apparent from the embodiments described below.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to embodiments of a method and system for updating a document database and associated search index. According to an embodiment, the search index is updated from SSoR while accepting push, update, and/or delete requests from content authors. The system maintains the integrity of data for situations where push, update, and/or delete requests of the same SSoR documents are received while the search index is simultaneously being updated. According to an embodiment, the asynchronous updating process comprises a number of sub-processes. To ensure integrity of data and obtain the fastest and most efficient processing time, there are specific rules regulating how the sub-processes function and how they push data from SSoR into the search index.

Figure 1:
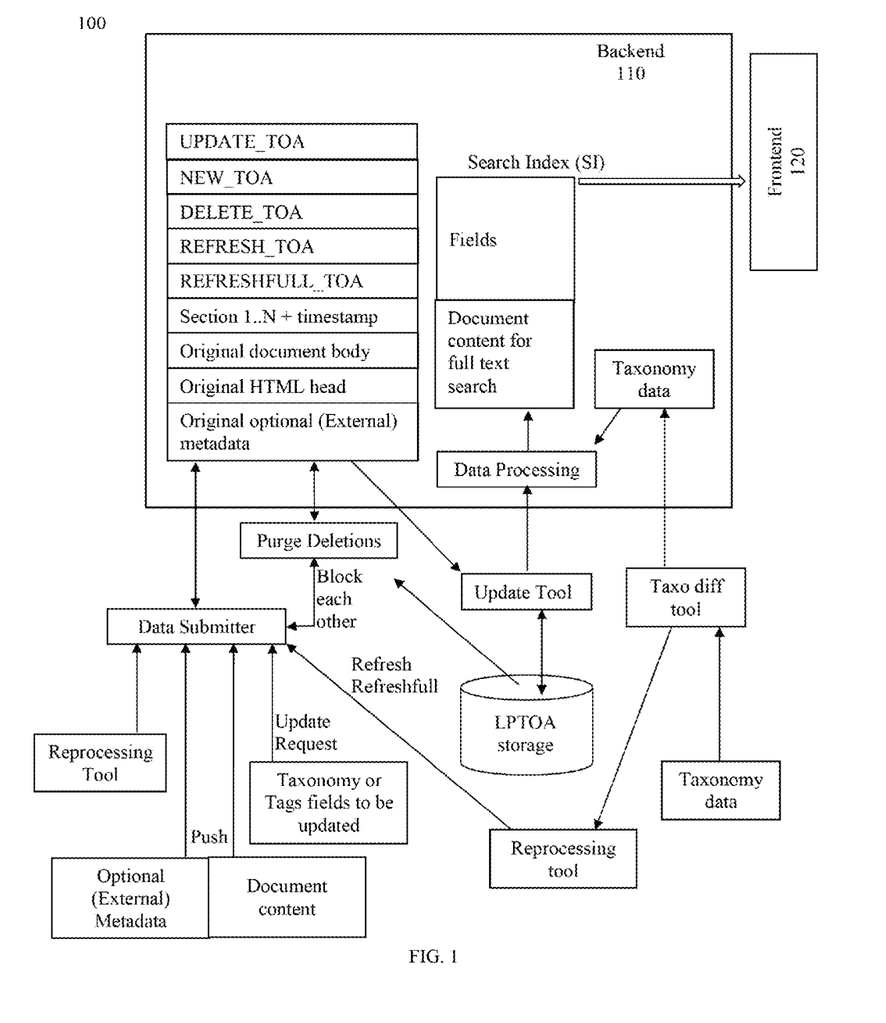
FIG. 1 is a schematic representation of a Source System of Record ("SSoR"), in accordance with an embodiment.

Referring to FIG. 1 is a data flow diagram 100 for maintaining a document database while simultaneously updating a search index for that document database. System 100 includes, for example, a Backend 110 and a Frontend 120. At the backend, for example, the system maintains the document database, including accepting push, update, and/or delete requests from one or more content authors, and maintaining/updating a search index. At the frontend, for example, the system offers a search index for a searcher to enter search terms for searching the document database. Accordingly, frontend 120 of system 100 can include, for example, a graphical user interface ("GUI") to receive search terms and present search results to the searcher.

According to an embodiment, system 100 utilizes an asynchronous process which updates the search index from the SSoR. The process contains a number of sub-processes which, according to an embodiment, are called "Workers." To ensure on-demand updating of a search index from SSoR while simultaneously accepting push, update, and/or delete requests from content authors, the process comprise rules that regulate how Workers function and how they push data from SSoR into the search index to insure integrity of data and fastest processing time.

Each sub-process, or Worker, is responsible for executing a particular action. For example, there can be the following Workers: (i) DeleteWorker (executing a deleting action to delete a document); (ii) NewWorker (executing a new action to create a new document); (iii) UpdateWorker (executing an update action to update a document, which can including making some metadata changes); (iv) RefreshWorker (executing an update action to update the document's metadata); (v) RefreshFullWorker (executing a RefreshFull action to update a full document, including the document's content).

Each worker functions within one or more predefined thresholds, which can be established individually for each worker. Thresholds can include, for example, the number of documents to retrieve, maximum time to run, number of documents per page, and many more. According to an embodiment, each worker utilizes a caching approach to navigate through results, thereby minimizing resources. Further, each worker can request only appropriate fields. For example, the body of a document will be requested by the NewWorker and RefreshfullWorker processes. Each worker may also only use a configurable threads pool to submit requests.

According to an embodiment, each document in the SSoR has a field to store a timestamp for each action set by a data submitter. The Time of Action (TOA) timestamp can be stored as a field with the Worker, such as WorkerUpdate_TOA or WorkerUpdateTOA.

The system may also include a stamp, field, or database with information about the last processed time of action ("LPTOA"), which is the timestamp of the last time a document was processed by a Worker.

To ensure integrity of the search index while SSoR continuously receives new push operations, the Workers can function in a pattern or order where actions are processed sequentially. Each action can be executed alone with appropriate runtime thresholds. Thus, if a Worker takes too long to execute and meets the runtime threshold, the Worker must stop and the next Worker can begin to execute. Each Worker can first execute a query against SSoR, to retrieve records which were not yet processed by that Worker/action, based on the appropriate TOA, and can process each record from the oldest unprocessed record.

According to an embodiment, therefore, each Worker stores its last processed TOA (called the "LPTOA") to be used at a later time as a starting point for processing. Some Workers also need to check the LPTOA of other Workers to make a decision about whether to continue processing a document or stop processing the document. An example of this condition is when a "New" request comes after "Delete" for a certain document, the NewWorker process can access the document but learns that the DeleteWorker did not yet process the document; the NewWorker exits and lets the next Worker run.

According to an embodiment, there is a special PurgeDeletions process which is responsible for cleaning up documents marked for deletion from the SSoR, such as those which were already deleted from the search index by the DeleteWorker. To ensure integrity of data, the PurgeDeletions process should not run in parallel with the data submitter.

According to an embodiment, the system reduces the required processing time for different actions. For example, according to existing methods if an author or content creator submits numerous "New" actions, all other requests from others would have to wait until the "New" actions have been completely processed. Pursuant to the current invention, however, the system does not hold up other "Delete" and "Update" requests unless they involve the same document. In that situation, the integrity check will force the appropriate Worker to stop and wait in order.

Worker Processing

Figure 2:
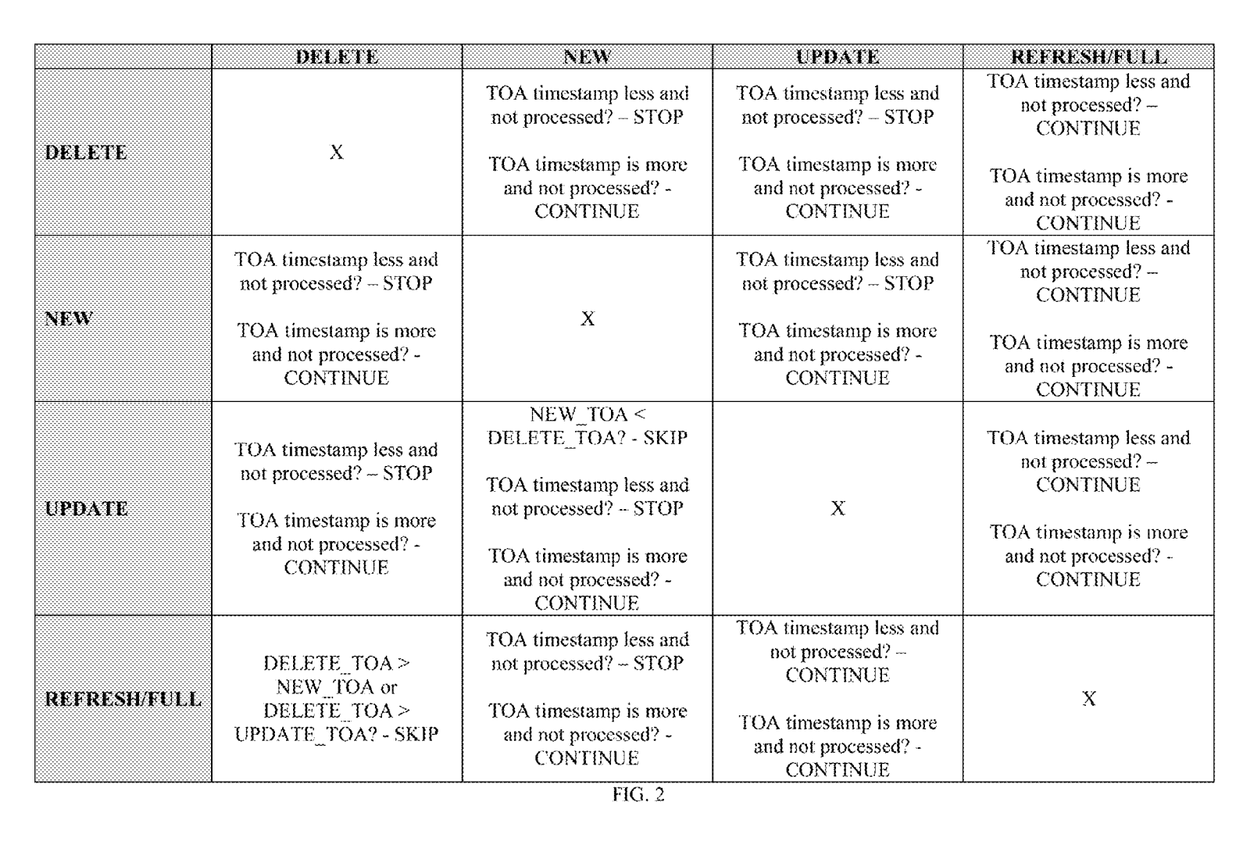
FIG. 2 is a table of rules for an SSoR processing system and method, in accordance with an embodiment.

Referring to FIG. 2, in accordance with an embodiment, is a Table containing a summary of all rules for the various Workers. Functioning of each of the Workers within the ruleset is discussed in more detail below.

1. DeleteWorker

According to an embodiment, the system receives a command for an action to be executed by the DeleteWorker process. At a first step, the system loads the last processed TOA for each Worker ([Worker]_LPTOA), a total of five LPTOAs. At a second step, the system executes the query to the SSoR with a filter: DELETE_TOA>DELETE_LPTOA (stored externally).

Thus, according to an embodiment, the system requests the following fields: DELETE_TOA; NEW_TOA; UPDATE_TOA; and URL/other. For each document, as shown in FIG. 2, the following rules are followed:
  a. IF (UPDATE_TOA<DELETE_TOA) AND (UPDATE_TOA>UPDATE_LPTOA) then STOP execution, and exit; and
  b. IF (NEW_TOA<DELETE_TOA) AND (NEW_TOA>NEW_LPTOA) then STOP execution, and exit.
  c. IF the above rules fail and the document is to be deleted, it can be deleted from the main index via the delete request
  d. Update DELETE_TOA=>DELETE_LPTOA (stored externally)
  e. Check for Worker execution time to be less than threshold; stop if execution time exceeds time threshold.
  f. Proceed to the next document if any more are available (can include pagination if needed).

2. UpdateWorker

According to an embodiment, the system receives a command for an action to be executed by the UpdateWorker process. At a first step, the system loads the last processed TOA for each Worker ([Worker]_LPTOA), a total of five LPTOAs. At a second step, the system executes the query to the SSoR with a filter: UPDATE_TOA>UPDATE_LPTOA (stored externally).

Thus, according to an embodiment, the system requests the following fields: DELETE_TOA; NEW_TOA; UPDATE_TOA; REFRESH_TOA; REFRESHFULL_TOA; HTML head; External Metadata; and URL/other. For each document, as shown in FIG. 2, the following rules are followed:
  a. IF (DELETE_TOA>NEW_TOA) then SKIP, because the document is scheduled for deletion and thus there is no need to update;
  b. IF (DELETE_TOA<UPDATE_TOA) AND (DELETE_TOA>DELETE_LPTOA) then STOP execution, and exit;
  c. IF (NEW_TOA<UPDATE_TOA) AND (NEW_TOA>NEW_LPTOA) then STOP execution, and exit;
  d. Check the TOA for each section, choose section(s) which TOA matches UPDATE_TOA, and that is a section(s) which has to be updated in the main index;
  e. Update the section(s);
  f. Update UPDATE_TOA=>UPDATE_LPTOA (stored externally);
  g. Check for worker execution time to be less than the threshold, and stop if execution time exceeds time threshold;
  h. Proceed to the next document if any more are available.

3. NewWorker

According to an embodiment, the system receives a command for an action to be executed by the NewWorker process. At a first step, the system loads the last processed TOA for each Worker ([Worker]_LPTOA), a total of five LPTOAs. At a second step, the system executes the query to the SSoR with a filter: NEW_TOA>NEW_LPTOA (stored externally).

Thus, according to an embodiment, the system requests the following fields: DELETE_TOA; NEW_TOA; UPDATE_TOA; REFRESH_TOA; REFRESHFULL_TOA; SECTION 1 . . . N: all fields+TS; HTML head; External Metadata; Document Content; and URL/other. For each document, as shown in FIG. 2, the following rules are followed:

a. IF (UPDATE_TOA<NEW_TOA) AND (UPDATE_TOA>UPDATE_LPTOA) then STOP execution, and exit;
b. IF (NEW_TOA<NEW_TOA) AND (NEW_TOA>NEW_LPTOA): STOP execution, and exit
c. Push document
d. Update NEW_TOA=>NEW_LPTOA (stored externally)
e. Check for worker execution time to be less than the threshold, and stop if execution time exceeds time threshold;
f. Proceed to the next document if any more are available.

4. RefreshWorker

According to an embodiment, the system receives a command for an action to be executed by the RefreshWorker process. At a first step, the system loads the last processed TOA for each Worker ([Worker]_LPTOA), a total of five LPTOAs. At a second step, the system executes the query to the SSoR with a filter: REFRESH_TOA>REFRESH_LPTOA (stored externally).

Thus, according to an embodiment, the system requests the following fields: DELETE_TOA; NEW_TOA; UPDATE_TOA; REFRESH_TOA; REFRESHFULL_TOA; SECTION 1 . . . N: all fields+TS; HTML head; External Metadata; and URL/other. For each document, as shown in FIG. 2, the following rules are followed:
a. —IF (NEW_TOA<DELETE_TOA) AND (UPDATE_TOA<DELETE_TOA) then SKIP refresh, and go to next document (this means the latest document status is to be deleted, so no need to update)
b. —Send update request for: SECTION 1 . . . N: all fields; HTML head; ExternalMetadata; URL/other
c. Update REFRESH_TOA=>REFRESH_LPTOA (stored externally)
d. Check for worker execution time to be less than the threshold, and stop if execution time exceeds time threshold;
e. Proceed to the next document if any more are available 5. RefreshfullWorker According to an embodiment, the system receives a command for an action to be executed by the RefreshFullWorker process. At a first step, the system loads the last processed TOA for each Worker ([Worker]_LPTOA), a total of five LPTOAs. At a second step, the system executes the query to the SSoR with a filter: REFRESHFULL_TOA>REFRESHFULL_LPTOA (stored externally).

Thus, according to an embodiment, the system requests the following fields: DELETE_TOA; NEW_TOA; UPDATE_TOA; REFRESH_TOA; REFRESHFULL_TOA; SECTION 1 . . . N: all fields+TS; HTML head; External Metadata; Document Content; and URL/other. For each document, as shown in FIG. 2, the following rules are followed:
a. IF (NEW_TOA<DELETE_TOA) AND (UPDATE_TOA<DELETE_TOA) then SKIP refresh, and go to next document (that means the latest document status is to be deleted—no need to update)
b. Send update request for:—SECTION 1 . . . N: all fields+TS; HTML head; ExternalMetadata; Document Content; URL/other
c. Update REFRESHFULL_TOA=> REFRESHFULL_LPTOA (stored externally)
d. Check for worker execution time to be less than the threshold, and stop if execution time exceeds time threshold;
e. Proceed to the next document if any more are available

EXAMPLE 1

According to an embodiment is an example using a method for ensure the integrity of the search index while SSoR continuously receives new push operations. A data submitter, in this example, a total of 57 requests were received from a data submitter with the following timestamps and document IDs:

[1] 00:01—doc1—NEW
[2] 00:02—doc2—NEW
[3] 00:03—doc3—NEW
. . .
[20] 00:20—doc20—NEW
[21] 00:21—doc21—NEW
. . .
[50] 00:50—doc50—NEW
[51] 00:51—doc48—UPDATE
[52] 00:52—doc49—UPDATE
[53] 00:53—doc10—DELETE
[54] 00:54—doc12—REFRESH
[55] 00:55—doc50—REFRESH
[56] 00:56—doc48—DELETE
[57] 00:57—doc50—DELETE According to an embodiment, the system utilizes the Workers in the following order:
1. NEW
2. UPDATE
3. DELETE
4. REFRESH
5. REFRESHFULL
6. NEW
7. UPDATE
8. DELETE
9. REFRESH
10. REFRESHFULL
11. ETC.

At a first step, the NewWorker starts and NEW_LPTOA is set to 0. UPDATE_LPTOA(=0) and DELETE_LPTOA (=0) are retrieved. Documents are queried with ACTION=NEW & NEW_TOA>0, and the documents with a NEW action are returned (doc1, doc2, doc3, doc20, doc21, doc 50). These documents are then processed in the order of their timestamps. For each document the following is performed, with doc10 as an example:
a. Retrieve: NEW_TOA (=00:10) (timestamp of NEW operation); UPDATE_TOA(=0); DELETE_TOA (=00:53); REFRESH_TOA (=0); REFRESHFULL_TOA (=0); HTML head+metadata+body;
b. Apply the following: is NEW_TOA (=00:10)>UPDATE_TOA (=0) (yes) AND UPDATE_LPTOA (=0)<UPDATE_TOA (=0) (no)?=>CONTINUE (is there an earlier unprocessed UPDATE request—no);
c. Apply the following: is NEW_TOA (=00:10)>DELETE_TOA (=00:53) (no) AND DELETE_LPTOA (=0)<DELETE_TOA (=0) (no)?=>CONTINUE (is there an earlier unprocessed DELETE request—no);
d. Create a new document in the index;
e. Apply NEW_LPTOA:=00:10 (doc10_NEW_TOA);
f. Ask are the thresholds (number of docs/time of execution) met or in danger of being met?;
g. Proceed to the next document;

h. Assuming last processed document was doc20 when time threshold met (NEW_LPTOA=00:20); and
i. STOP.

At a first step, the UpdateWorker starts and UPDATE_LPTOA is set to 0. NEW_LPTOA(=00:20) and DELETE_LPTOA(=0) are retrieved. Documents are queried with ACTION=UPDATE & UPDATE_TOA>UPDATE_LPTOA (=0). Documents doc48 and doc49 are then returned from the query. These documents are then processed in the order of their timestamps. For each document the following is performed, with documents doc48 and doc49 as an example, starting with doc48:
  a. Retrieve: NEW_TOA (=00:48) (timestamp of NEW operation); UPDATE_TOA(=00:51); DELETE_TOA (=00:56); REFRESH_TOA (=0); REFRESHFULL_TOA (=0); HTML head+metadata+body;
  b. Apply the following: is DELETE_TOA (00:56)>NEW_TOA (00:48) (yes) (is there later DELETE request—yes)=>skip (document will be deleted anyway later); UPDATE_LPTOA:=00:51 (doc48_UPDATE_TOA)
Then, doc 49 is processed:
  a. Retrieve: NEW_TOA (=00:49) (timestamp of NEW operation); UPDATE_TOA(=00:52; DELETE_TOA (no DELETE action executed yet); REFRESH_TOA (=0); REFRESHFULL_TOA (=0); HTML head+metadata+body;
  b. Apply the following: is DELETE_TOA (=0)>NEW_TOA (=00:49) (no) ? (is there later DELETE request—no)=>then proceed to processing;
  c. Apply the following: is UPDATE_TOA (=00:52)> DELETE_TOA (=0) (yes) AND DELETE_LPTOA (=0)<UPDATE_TOA (=0) (no)?=>CONTINUE (is there earlier unprocessed DELETE—no);
  d. Apply the following: is UPDATE_TOA (=00:52)> NEW_TOA (00:49) (yes) AND NEW_LPTOA (=00:20)<NEW_TOA (=00:49) (yes)?=>(is there earlier unprocessed NEW—yes) then STOP.

At a first step, the DeleteWorker starts and DELETE_LPTOA is set to 0. NEW_LPTOA(=00:20) and DELETE_LPTOA(=00:51) are retrieved. Documents are queried with ACTION=DELETE & DELETE_TOA>DELETE_LPTOA (=0). Documents doc10, doc48, and doc50 are then returned from the query. These documents are then processed in the order of their timestamps. For each document the following is performed, with document doc 10 as an example:
  a. Retrieve: NEW_TOA (=00:10) (timestamp of NEW operation); UPDATE_TOA(=00:53); DELETE_TOA (=0); REFRESH_TOA (=0); REFRESHFULL_TOA (=0); URL;
  b. Apply the following: is DELETE_TOA (=00:53)> NEW_TOA (=00:10) (yes) AND NEW_LPTOA (=00:20)<NEW_TOA (=00:10) (no)?=>ok, processing (is there earlier unprocessed NEW request—no);
  c. Apply the following: is DELETE_TOA (=00:53)>UPDATE_TOA (=0) (yes) AND UPDATE_LPTOA (=00:51)<UPDATE_TOA (=0) (no)?=>ok, processing (is there earlier unprocessed UPDATE request—no);
  d. Delete document from the index and set DELETE_LPTOA=00:53
Then document doc48 is processed:
  a. Retrieve: NEW_TOA (=00:48) (timestamp of NEW operation); UPDATE_TOA(=00:51); DELETE_TOA (=00:56); REFRESH_TOA (=0); REFRESHFULL_TOA (=0); URL;
  b. Apply the following: is DELETE_TOA (=00:53)> NEW_TOA (=00:48) (yes) AND NEW_LPTOA (=00:20)<NEW_TOA (=00:48) (yes)?=>STOP (is there earlier unprocessed NEW request—yes);
  c. Apply the following: is DELETE_TOA (=00:53)>UPDATE_TOA (=00:51) (yes) AND UPDATE_LPTOA (=00:51)<UPDATE_TOA (=00:51) (no)?=>then approved to process (checking if there is unprocessed UPDATE request);
  d. (last condition is not checked, as the worker stops at the first check).

At a first step, the RefreshWorker starts and REFRESH_LPTOA is set to 0. NEW_LPTOA(=00:20), UPDATE_LPTOA(=00:51), and DELETE_LPTOA(=00:53), are retrieved. Documents are queried with ACTION=REFRESH & REFRESH_TOA>REFRESH_LPTOA (=0). Documents doc12 and doc50 are then returned from the query. These documents are then processed in the order of their timestamps. For each document the following is performed, with document doc 12 as an example:
  a. Retrieve: NEW_TOA (=00:12) (timestamp of NEW operation); UPDATE_TOA(=0); DELETE_TOA (=0); REFRESH_TOA (=00:54); REFRESHFULL_TOA (=0); URL; and HTML head+metadata+body;
  b. Apply the following: is DELETE_TOA< >0? No. (is there earlier unprocessed DELETE request—no)
  c. Apply the following: is UPDATE_TOA< >0? No. (is there earlier unprocessed UPDATE request—no)
  d. Apply the following: is NEW_TOA< >0? Yes.
  e. Apply the following: is REFRESH_TOA (=00:54)> NEW_TOA (=00:12) (yes) AND NEW_LPTOA (=00:20)<NEW_TOA (=00:12) (no)?=>ok (is there earlier unprocessed NEW request—no);
  f. Refresh document;
  g. Set UPDATE_LPTOA=00:54
Then doc50 is processed:
  h. Retrieve: NEW_TOA (=00:50) (timestamp of NEW operation); UPDATE_TOA(=0); DELETE_TOA (=00:57); REFRESH_TOA (=00:55); REFRESHFULL_TOA (=0); URL; and HTML head+metadata+body;
  i. Apply the following: is NEW_TOA< >0? Yes. (is there earlier unprocessed NEW request)
  j. Apply the following: is REFRESH_TOA (=00:55)> NEW_TOA (=00:50) (yes) AND NEW_LPTOA (=00:20)<NEW_TOA (=00:50) (yes)?=>STOP;
  k. (is there earlier unprocessed NEW request—yes).

In order to continue processing the 50 documents in the example, the RefreshfullWorker runs, although there is no content to process. The functionality of the RefreshfullWorker is similar to the RefreshWorker, except that full document gets refreshed, including the body. In additional steps, the NewWorker, UpdateWorker, DeleteWorker, and RefreshWorker function sequentially, in that order using the processes described or otherwise envisioned herein.

Accordingly, at the conclusion of the processing of the documents in this example, the integrity of the search index has been maintained while the push operations have been processed by the SSoR.

Figure 3:
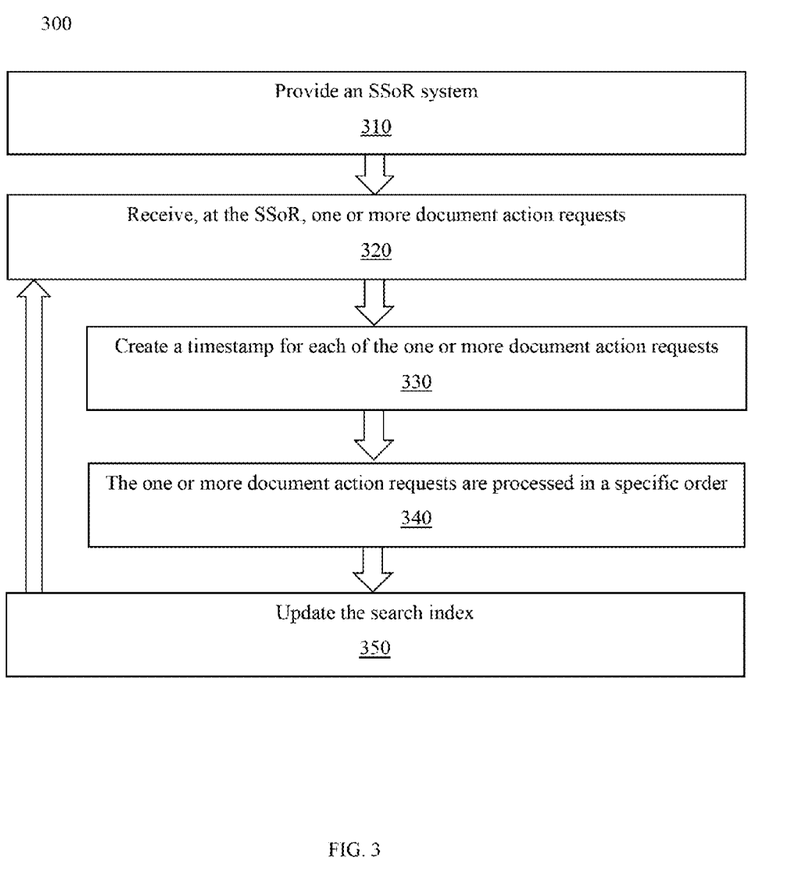
FIG. 3 is a flow chart of a method for maintaining a search index while updating an SSoR, in accordance with an embodiment.

Referring to FIG. 3, according to an embodiment, is a flowchart of a method 300 for maintaining a search index while continuously receiving new push operations to an SSoR. At step 310, an SSoR system 100 is provided. The SSoR can be any of the SSoR systems described or otherwise envisioned herein, and may comprise any of the components described or otherwise envisioned herein. At a minimum the SSoR comprises or is communication with and/or utilized for a search index of the documents within the SSoR.

At step 320 of the method, the SSoR receives one or more document actions requests. The document action requests can be submitted, for example, by a user, or can be submitted as part of an automated process. For example, a user may create an action request through a user interface. The document action request can be any of the actions described or otherwise envisioned herein, including but not limited to a new, update, and/or delete action, among others. For example, a data submitter may make a change to an existing SSoR document using a user interface that has to be reflected in SSoR document, including while the search index is being updated or otherwise maintained. Those changes will be made to the SSoR document using an update action, such as via the example UpdateWorker process described above.

At step 330 of the method, a timestamp is created and/or assigned to each of the one or more document action requests. As each document action request is received, it will be assigned a timestamp. According to an embodiment, a database record is created for each document action request. The database record can include, for example, document metadata such as a timestamp or other information.

At step 340 of the method, the create document actions are processed in wherein create actions are processed first, update actions are processed second, and delete actions are processed last.

At step 350 of the method, the search index is updated with the updated document database where new documents have been created, and/or documents have been updated, and/or documents have been deleted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for maintaining a document database and search index, the method comprising the steps of:
   receiving a plurality of document action requests, wherein the plurality of document action requests comprise at least one of a create document action request, an update document action request, or a delete document action request;
   associating a timestamp with each of the plurality of received document action requests;
   querying the document action requests to determine which are associated with a first document action request type;
   processing any of the document action requests of the first document action request type, wherein the document action requests are processed in the order of their associated timestamp, with earlier document action requests of the first document action request type being processed first; and
   updating the search index using the updated document database.

2. The method of claim 1, further comprising the steps of:
   querying the document action requests to determine which are associated with a second document action request type; and
   processing any of the document action requests of the second document action request type, wherein the document action requests are processed in the order of their associated timestamp, with earlier document action requests of the second document action request type being processed first;
   wherein the document action requests of the second document action request type are processed only if the document action requests of the first document action request type have been processed.

3. The method of claim 2, further comprising the steps of:
   querying the document action requests to determine which are associated with a third document action request type; and
   processing any of the document action requests of the third document action request type, wherein the document action requests are processed in the order of their associated timestamp, with earlier document action requests of the third document action request type being processed first;
   wherein the document action requests of the third document action request type are processed only if the document action requests of the second document action request type have been processed.

4. The method of claim 3, wherein create document action requests are processed first, update document action requests are processed second, and delete document action requests are processed last.

5. The method of claim 1, wherein said search index is based on document content, taxonomy data, and one or more metadata fields from the document database.

6. The method of claim 1, further comprising the step of creating a database record for each document action request, wherein the database record comprises document data and document metadata.

7. The method of claim 6, wherein the document metadata comprises the timestamp for said document action request.

8. The method of claim 1, wherein each type of document action request is processed by a different sub-process, and further wherein each sub-process is associated with a time that the sub-processed last processed a document action request.

9. The method of claim 8, wherein the time that the sub-processed last processed a document action request is stored.

10. The method of claim 8, wherein each sub-process is associated with a predetermined processing time threshold.

11. The method of claim 9, further comprising the step of terminating a sub-process if the predetermined processing time threshold is exceeded.

12. An SSoR system, the system comprising:
    a document database comprising a plurality of documents;
    a search index; and
    a processor in communication with the document database and the search index, the processor configured to: (i) receive a plurality of document action requests, the plurality of document action requests comprising at least one of a create document action request, an update document action request, or a delete document action request; (ii) associate a timestamp with each of the plurality of received document action requests; (iii) query the document action requests to determine which are associated with a first document action request type; (iv) process any of the document action requests of the first document action request type, wherein the document action requests are processed in the order of their associated timestamp, with earlier document action requests of the first document action request type being processed first; and (v) update the search index using the updated document database.

13. The system of claim 12, wherein the processor is further configured to: (i) query the document action requests to determine which are associated with a second document action request type; and (ii) process any of the document action requests of the second document action request type, wherein the document action requests are processed in the order of their associated timestamp, with earlier document action requests of the second document action request type being processed first, wherein the document action requests of the second document action request type are processed only if the document action requests of the first document action request type have been processed.

14. The system of claim 13, wherein the processor is further configured to: (i) query the document action requests to determine which are associated with a third document action request type; and (ii) process any of the document action requests of the third document action request type, wherein the document action requests are processed in the order of their associated timestamp, with earlier document action requests of the third document action request type being processed first, wherein the document action requests of the third document action request type are processed only if the document action requests of the second document action request type have been processed.

15. The system of claim 14, wherein create document action requests are processed first, update document action requests are processed second, and delete document action requests are processed last.

16. The system of claim 13, wherein the processor is further configured to create a database record for each document action request, wherein the database record comprises document data and document metadata.

17. The system of claim 1, wherein each type of document action request is processed by a different sub-process, and further wherein each sub-process is associated with a time that the sub-processed last processed a document action request.

18. The system of claim 17, wherein the time that the sub-processed last processed a document action request is stored.

19. The system of claim 17, wherein each sub-process is associated with a predetermined processing time threshold.

20. The system of claim 19, wherein the processor is further configured to terminate a sub-process if the predetermined processing time threshold is exceeded.

* * * * *